O. WOODWARD.
TYPEWRITING MACHINE.
APPLICATION FILED SEPT. 3, 1918.
1,427,143.
Patented Aug. 29, 1922.
2 SHEETS—SHEET 2.
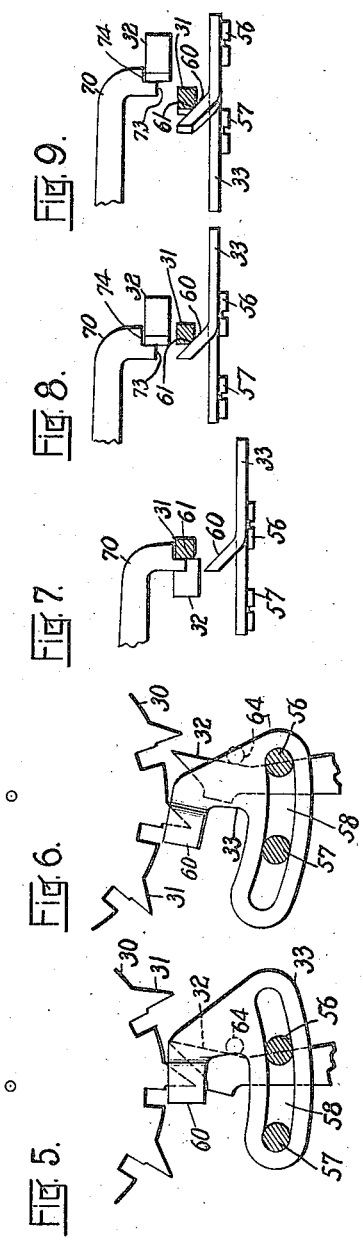
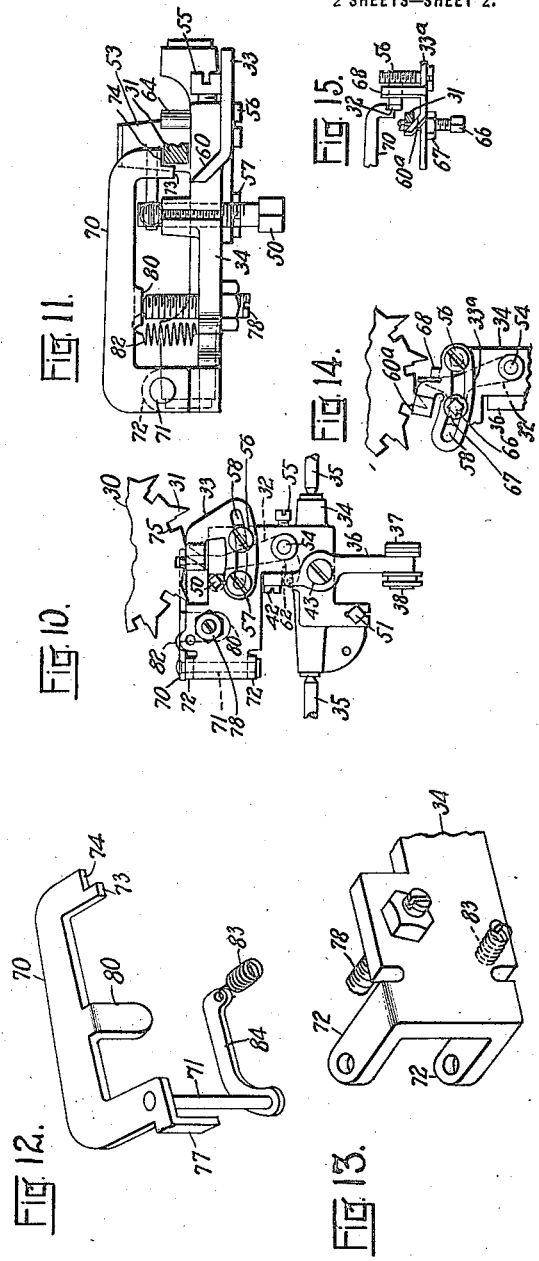
WITNESSES
INVENTOR
Oscar Woodward
By Jacob Felbel
HIS ATTORNEY

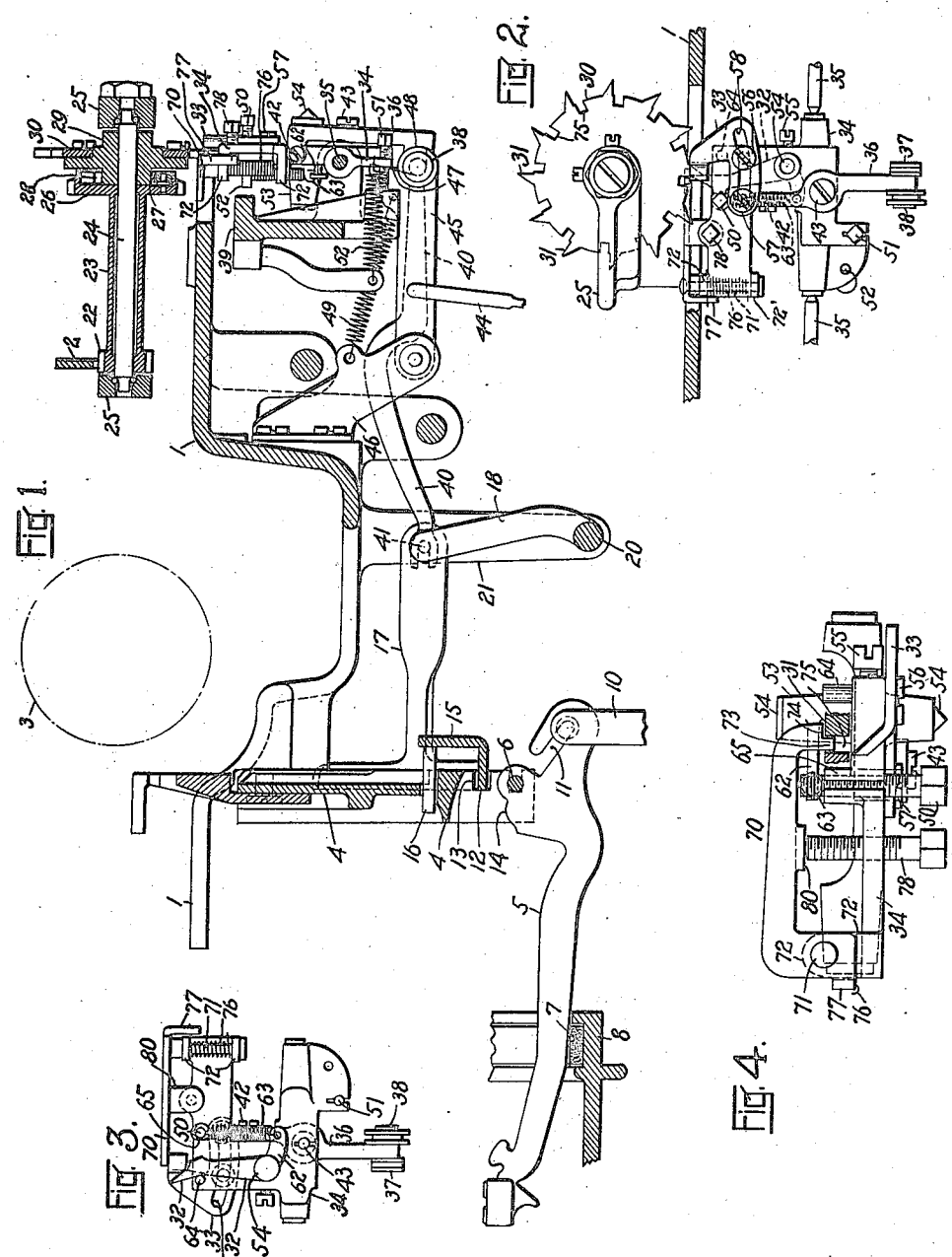

UNITED STATES PATENT OFFICE.

OSCAR WOODWARD, OF BABYLON, NEW YORK, ASSIGNOR TO REMINGTON TYPEWRITER COMPANY, OF ILION, NEW YORK, A CORPORATION OF NEW YORK.

TYPEWRITING MACHINE.

1,427,143.	Specification of Letters Patent.	Patented Aug. 29, 1922.

Application filed September 3, 1918. Serial No. 252,377.

*To all whom it may concern:*

Be it known that I, OSCAR WOODWARD, citizen of the United States, and resident of Babylon, in the county of Suffolk and State of New York, have invented certain new and useful Improvements in Typewriting Machines, of which the following is a specification.

My invention relates to typewriting machines, and more especially to the carriage escapement mechanism of such machines.

One of the objects of the invention is to improve the escapement with respect to the feed dogs, including an improved adjustment whereby the extent of drop afforded to the carriage on the positive stroke of the universal bar can be varied.

Another object is to provide in the escapement a rigid dog of improved construction.

Another object of the invention is to provide an improved dog for holding the escapement wheel against turning when the carriage is drawn back to begin a new line, the purpose of this dog being to prevent inequalities in the left-hand margin of the writing; this particular dog is herein called the "margin dog."

To the above and other ends my invention consists in certain features of construction, and combinations and arrangements of parts, all of which will be fully set forth herein and particularly pointed out in the claims.

In the accompanying drawings,

Figure 1 is a partial front to rear vertical sectional view of so much of a typewriting machine as is necessary to illustrate the embodiment of my invention therein.

Figure 2 is a rear elevation of the escapement mechanism with the top plate of the machine shown in section.

Figure 3 is a front elevation of the dog rocker and the parts mounted thereon removed from the machine.

Figure 4 is a top plan view of the same on an enlarged scale.

Figures 5 and 6 are fragmentary and more or less diagrammatic views of the escapement wheel and the feed dogs as seen from the rear, the parts being shown in the positions they occupy when the universal bar is fully operated. In Fig. 5 the rigid or holding dog is shown adjusted for no drop and in Fig. 6 said dog is shown adjusted to allow a considerable drop to the escapement wheel on the down stroke of a key.

Figures 7, 8 and 9 are diagrammatic top views of the feed dogs and so-called "margin dog," one tooth of the escapement wheel being shown in section in each figure. In Figs. 7 and 8 the rigid dog is shown adjusted for no drop, the position corresponding in this respect to Fig. 5, whereas in Fig. 9 said rigid dog is shown adjusted as in Fig. 6. In Figs. 8 and 9 the dog rocker is operated by the depression of a key, whereas in Fig. 7 the parts are in normal position.

Figures 5 to 9 are on an enlarged scale.

Figure 10 is a rear elevation of the escapement mechanism but showing a different form of spring for the margin dog.

Figure 11 is a top plan view of the same on an enlarged scale.

Figure 12 is a perspective view of the margin dog with a third form of returning spring.

Figure 13 is a perspective view of a fragment of the dog rocker adapted for the margin dog shown in Figure 12.

Figures 12 and 13 are on an enlarged scale.

Figures 14 and 15 are fragmentary rear and top views respectively, showing a form of adjustable rigid dog having thereon a stop for the loose or stepping dog.

My invention is applicable or adaptable to typewriting machines generally but it is here shown applied to a machine similar in many respects to the Remington No. 10 typewriter but more like that shown in the application of George A. Seib, filed September 6, 1916, Serial No. 118,607.

The main frame of this machine comprises a top plate 1, mounted in the usual manner on four posts rising from a rectangular base and said top plate, having mounted thereon front and rear rails which support a carriage, none of which is shown in the present instance excepting the feed rack 2, which is a part of, or is carried by, the carriage. Said carriage supports the usual roller platen 3. The top plate 1 also supports a type bar segment 4 having radial slots in which are mounted type bars 5 pivoted on a pivot wire 6 and normally resting on a pad 7 supported by a part 8 of the main frame. The type bars are actuated by sub-levers 10 having pins which play in slots 11 in the type bars, said sub-levers being operated by printing keys in any suitable manner. A universal bar 12 lies in an annular slot 13 in the back face of the segment 4 and is adapted to be pushed toward the rear by shoulders 14 on the type bars. Said universal bar has a bracket 15 from which a guide pin 16 projects through a hole in the segment 4. Said universal bar has also two rearwardly directed arms 17 which are pivoted at their rear ends to arms 18 on a transverse rock shaft 20 which in turn is pivoted in brackets 21 depending from the top plate 1. The construction is such that whenever one of the type bars is operated the universal bar is given a positive stroke toward the rear of the machine and a return stroke toward the front of the machine.

The feed rack 2 of the typewriter carriage meshes with a feed pinion 22 integral with a sleeve 23 which is journaled on a shaft 24, which shaft is journaled by ball bearings in a bracket 25 mounted on the top plate 1. At its rear end the sleeve 23 has a housing 26 in which is pivoted a pawl 27, Fig. 1, engaging ratchet teeth 28 formed on the hub 29 of an escapement wheel 30, the construction being such that when the carriage feeds toward the left the escapement wheel turns with it, but when it is withdrawn toward the right the pawl 27 can move idly over the ratchet teeth 28, leaving the escapement wheel stationary. The hub 29 is fast on the shaft 24.

The escapement wheel 30 has escapement teeth 31 which are controlled by a stepping dog 32 and a fast or rigid dog 33, said dogs being mounted on a dog support or dog rocker 34. The dog rocker 34 is mounted to vibrate on a transverse horizontal axis, being pivoted on cone pivots 35, Fig. 2, mounted in a bracket 39 (Fig. 1) which depends from the top plate 1. Said dog rocker has a downwardly extending arm 36 having thereon two wrist pins 37 and 38, Fig. 2, to the former of which is pivoted the rear end of a link or push bar 40, Fig. 1, the forward end of which is forked to embrace a pin 41 on one of the arms 18, which arms are rocked by the operation of the universal bar 12. The construction is such that at the positive stroke of said universal bar the arm 36 moves toward the rear of the machine and the upper part of the dog rocker, carrying the dogs 32 and 33, moves toward the front of the machine.

For the purposes of my invention the arm 36 is a rigid arm of the dog rocker though it is here constructed as set forth in the application of George A. Seib, filed September 6, 1916, Serial No. 118,607, now Patent No. 1,289,934, dated Dec. 31, 1918, said dog rocker being made of a separate piece secured to the dog rocker by two screws 42 and 43, the former being a pivot screw and the latter an adjusting screw. The dog rocker is operated from the space key of the machine through means including a link 44 pivoted to a lever 45 of the third order, which lever at its forward end is pivoted to a fixed bracket 46 and at its rear end has a cam edge 47 acting on a roller 48 mounted on the wrist pin 38. The lever 45 has a restoring spring 49.

Two stop screws 50 and 51 are mounted in the dog rocker, the first above and the second below the pivotal axis thereof to strike against the bracket 39 to limit the motion of the dog rocker. Said dog rocker is returned to normal position by a spring 52, Fig. 1.

The stepping dog 32 is mounted on the forward face of the dog rocker and it has an elongated hub 53, Figs. 1 and 4, mounted on a pin 54 inserted in the dog rocker and secured in place by a set screw 55.

The rigid dog 33 is preferably a bevel dog and it can be variously constructed but the construction as shown in the present instance can be readily understood from Figs. 5 to 9, where it will be seen that this dog consists of a piece of sheet metal secured to the rear flat face of the dog rocker by two screws 56 and 57 passing through a slot 58 in the dog, whereas the tooth or engaging part 60 of the dog consists of an ear or branch bent off across the top of the dog rocker toward the front of the machine at an oblique angle such as to give the desired bevel to the dog. The bevel dog 60 is adapted to engage a corner or edge 61 of the lowermost one of the rack teeth 31 and said corner may be more or less beveled or rounded as shown in Fig. 7. The bevel dog 60 is so disposed as that the edge or corner 61 of the tooth has line or surface contact with said dog when said tooth has engagement, as shown in Fig. 8. The screws 56 and 57 can be loosened to allow of an adjustment of the fast dog in a right and left-hand direction and tightened to secure said dog in its adjusted positions. In Figs. 5, 7 and 8 said dog is shown adjusted to its greatest extent to the right, as viewed in said figures, that is to say, as seen from the rear of the machine. In this position of the dog the escapement affords no drop to the carriage; that is to say, when the dog rocker is operated as shown, the rack tooth 31 has practically no motion until the dog rocker begins its return stroke. In Figs. 6 and 9, however, the fast dog is shown adjusted to its extreme left-hand position where it affords a considerable drop to the tooth 31 and typewriter carriage on the positive stroke of the dog rocker. One of the principal features of my invention resides in the adjustability of the rigid dog whereby different extents of drop are afforded, or no drop, as desired; and also in the fact that the means for guiding the rigid dog in its adjusting movements, which means in the present instance includes the slot 58 is not made straight but is made in the form of an arc having its center in the axis of the escapement wheel 30, with the result that the tooth 31 engages the bevel dog 60 in precisely the same manner in all adjustments of said dog. In every adjusted position of said dog the dog is at the same distance from the center of the escapement wheel, and it also bears the same relation to the radius of the wheel defined by the engaging edge 61 of the tooth 31, so that if said tooth has line contact or surface contact with the bevel dog 60 when the latter is adjusted for no drop, as in Figs. 5 and 8, it will also have line contact or surface contact with said dog in any other adjustment of the latter, such for example as the extreme adjustment shown in Figs. 6 and 9. If it were not for the peculiar character of the adjustment of this dog, in some of its positions at least, the dog would be engaged by the tooth 31 not along a line or on a surface but solely at a single point, such for example as the lower end of the edge 61. The result of this would be of course that there would be far greater wear of the parts and this wear would be in the nature of scratches which would roughen the surfaces and cause friction and imperfect operation, and also reduce the life of the mechanism.

It will be perceived that the rigid dog shown and described can not only be adjusted to get different results, but it can also be very readily removed and replaced by another, if desired for any reason, and that when a dog 33 is put into place the screw holds in the dog rocker for the screws 56 and 57, and the opening 58 in the dog itself, are so located as to insure to the beveled, tooth-engaging portion 60 line contact with the engaged tooth of the wheel. It will also be perceived that said dog is of extremely inexpensive construction, consisting merely of a bit of sheet metal.

The stepping dog 32 has an arm 62, Fig. 3, to which is connected one end of a spring 63, the other end of which is connected to the stop screw 50, said spring tending to give the stepping dog its stepping motion toward the left in Fig. 3 or toward the right in Figs. 2 and 5, and such stepping motion of said dog is arrested by a pin 64 projecting toward the front of the machine from the dog rocker 34. When the stepping dog is engaged by a tooth 31 of the escapement wheel it is, by the power of the carriage spring, pressed in the opposite direction to its normal position where it rests against a shoulder 65, Fig. 4, consisting of a lug of the dog rocker through which the stop screw 50 is threaded.

In those instances where the holding dog has a considerable range of adjustment, there is no one position for the stop 64 which is most advantageous for all adjustments of said dog, but, on the contrary, when a long drop is afforded, it is better that the stepping dog have a shorter stepping movement than it should have when no drop or only a short drop is provided for. Indeed, in some extreme adjustments of the rigid dog so great a drop would be afforded to the escapement wheel that if the loose dog went clear back against the pin 64 it might happen that said dog would find itself in front of the next oncoming tooth 31, that is to say, between said tooth and the front of the machine instead of registering with the space between two teeth as it should. In this event on the return stroke of the dog rocker this loose dog would come against the forward face of the oncoming tooth 31, momentarily arresting the dog rocker and ultimately allowing said tooth to escape without having been arrested by the loose dog, and giving the carriage two steps at a stroke instead of one. I, therefore, provide means when allowing an extreme drop to the escapement wheel and carriage, for arresting the loose dog earlier in its stepping motion than when the rigid dog is adjusted for no drop or for only a slight drop. In Figs. 14 and 15 I have shown a second stop to arrest the stepping motion of the dog 33 in those cases where the rigid dog is adjusted to give a large extent of drop. In Fig. 14 I have shown the rigid dog 60$^a$ in a slightly different form from that shown in the other figures of the drawing. In said Fig. 14 the screw 56 is placed a little higher than in the other figures and instead of the screw 57 I have employed a screw 66 which performs the double function of assisting in securing the dog 60$^a$ to the dog rocker and also of serving as a stop screw in place of the screw 50. These two screws 56 and 66 pass through a slot 58 having the same general characteristics as that in the other figures of the drawing and a lock nut 67 on the screw 66 can be tightened down to help secure the rigid dog in its various adjustments. Said dog has a tail or finger 68 bent off therefrom toward the front of the machine and serving as a back stop for the stepping dog in those adjustments of the dog 60$^a$ in which a long drop is provided for.

When this dog is adjusted for no drop, however, the stop 68 would be adjusted too far to the right in Fig. 14, and I have therefore prolonged the screw 56, Fig. 15, to serve as a fixed stop for the dog 32 beyond which said dog cannot go in any adjustment of the dog 60$^a$, said screw taking the place of the pin 64 shown in the other figures. It will be perceived that when said dog 60$^a$ is adjusted for no drop or for only a small extent of drop, the screw 56 arrests the loose dog 32, and that when the dog 60$^a$ is adjusted for a long drop, said dog 32 is arrested earlier in its stepping stroke by the adjustable stop 68. It will be perceived that this last stop 68 is adjustable with the adjustable rigid dog.

I provide in my escapement an improved "margin dog" to prevent inequalities in the left-hand margin of the writing. When the carriage of a typewriting machine is drawn back to the right to begin a new line, it is commonly arrested by a margin stop and the intention is that said stop shall arrest the carriage at the same letter space position on each and every return movement thereof so that the left-hand margin of the writing shall be uniform. When the carriage has been thus returned by hand and released, it is caught in the first letter space position in the new line of writing by the escapement mechanism. The margin is sometimes rendered uneven, however, by certain peculiarities of operation known to persons skilled in the art, the result of which is that during the return motion of the carriage the stepping dog, which normally engages the escapement wheel, has let go of one tooth of said wheel and is resting idly between two teeth. When this occurs the carriage makes one step after being released so that that particular line of writing will begin one letter space to the right of the other lines of writing, leaving an uneven margin. The stepping dog can get into the intermediate position described either by certain operations of the line lock mechanism or by an operation of a key or the space key during the return of the carriage, in short, by an operation of the escapement mechanism at a time when the carriage cannot make a step. I have provided an improved dog, which I call a "margin dog" to prevent the inequality in the left-hand margin of the writing above referred to.

The margin dog 70, Figs. 2, 3 and 4, consists of an arm rigidly mounted on an arbor or rock shaft 71 which is pivoted in ears 72 bent off from an extension of the dog rocker 34. The arm 70 lies in a horizontal position and the pivot arbor 71 is vertical, and the two ears 72 are spaced wide apart in order to give a long bearing for said pivot. At its free end said arm 70 has a tooth or lug 73 projecting beyond a shoulder 74, said lug adapted to enter, and nearly to fill, a notch 75 cut for the purpose in the body of the escapement wheel 30 in the vicinity of each of the teeth 31. The tooth 73 is of a width in a right and left-hand direction nearly equal to the width of the notch 75 so that when said tooth is in engagement with said notch the escapement wheel is positively locked against turning in either direction. A spring 76 is coiled about the pivot 71 and one end is pressed against the dog rocker and the other end is hooked around an ear 77 of the dog 70, and this spring tends to press the said dog 70 toward the rear of the machine. Its motion relative to the dog rocker in that direction is limited by a stop screw 78, screwed through the dog rocker, and an ear 80 bent down from the dog 70. The screw 78 is so adjusted as to allow the tooth 73 to enter the notch 75 to about the extent indicated in Fig. 4, when the dog rocker is in its normal position, but when said dog rocker is moved toward the front of the machine, this tooth is withdrawn from all engagement with the escapement wheel by said screw 78. Said screw can be adjusted to regulate the normal position of the margin dog with respect to the amount of its lap on the escapement wheel and to variably control the disengagement of the margin dog on the rack. The result of this construction is that when the carriage is drawn back towards the right, either with the feed rack 2 in engagement with the pinion 22, or released from said pinion, the escapement wheel is held against any turning motion at all and this is true whether or not the stepping dog 32 is in its normal engagement with one of the teeth 31. If said stepping dog is in such engagement with a tooth the margin is made in the ordinary way; but if the stepping dog is out of engagement, then the tooth 73 takes its place for the first letter written in the new line of writing, holding the wheel stationary until the printing key has been operated and releasing it the same as if it were itself one of the escapement dogs when the dog rocker receives its first positive stroke.

Margin dogs for the same general purpose and operating in the same general way as that shown in Figs. 1 to 4 inclusive, are not new but my margin dog is an improvement over any of which I am aware. The pressure due to the effort of the escapement wheel to turn is received by my margin dog in the direction of the length of the dog and at right angles to its pivotal axis, said dog being pivoted to swing in a plane tangent to the circle in which the part of the wheel moves that is engaged by said dog, and the dog itself lying tangent to said circle when in engagement with said wheel.

A margin dog of this character is required to enter the notch 75 with great promptness, and it is therefore necessary that it have a good pivotal bearing and a quick acting or snappy acting spring, and at the same time it is not permissible to use a stiff spring which would interfere with the proper operation of the dog rocker in case the tooth 73 pressed against the front face of the escapement wheel before the notch 75 reached said tooth.

In Figs. 10 and 11 I have shown a modification of this dog which consists in substituting for the spring 76 a spring 82, this last being a tension spring connected at its rear end to the dog rocker and at its forward end to the dog 70 between its ends, said spring in the present instance being hooked into the ear 80. This spring causes less friction on the pivot than the spring 76 shown in Figs. 1 to 4.

In Figs. 12 and 13 I have shown further refinement of this spring action, the spring 83 here shown being connected to an arm 84 rigidly fastened to the lower end of the pivotal arbor 71 and extending thence toward the right in Fig. 12, which is a rear view. Said spring 83 is connected at its rear end to the dog rocker, as shown in Fig. 13. This spring has the same action as the spring 82 of Fig. 11 but is preferable thereto because it is in a lower part of the dog rocker where it is less exposed to contact and injury than the spring 82. The ear 77 is retained in this form of the dog because it acts as a stop to limit the motion of the dog 70 about its pivot.

Various changes can be made in the details of construction and arrangement without departing from my invention.

What I claim as new and desire to secure by Letters Patent, is:

1. In the carriage escapement of a typewriting machine, the combination with an escapement rack, of a normally engaged stepping dog, a normally disengaged dog, means for adjusting said disengaged dog to vary the extent of drop, and means for arresting said stepping dog earlier in its stepping motion when said disengaged dog is adjusted for a long drop than when adjusted for a shorter drop or for no drop.

2. In the carriage escapement of a typewriting machine, the combination with an escapement rack, of a normally engaged stepping dog, a normally disengaged dog, means for adjusting said disengaged dog to vary the extent of drop, and a stop for said stepping dog adjustable with said adjustable dog.

3. In the carriage escapement of a typewriting machine, the combination with an escapement rack, of a dog rocker, a stepping dog mounted thereon, a rigid dog on said dog rocker and adjustable to vary the extent of drop, and a stop for said stepping dog on and adjustable with said rigid dog.

4. In the carriage escapement of a typewriting machine, the combination with an escapement rack, of a stepping dog, an adjustable dog and two stops for arresting the said stepping dog when it is disengaged from the rack, one of said stops being adjustable with said adjustable dog and coming into use in certain adjustments thereof.

5. In the carriage escapement of a typewriting machine, the combination with an escapement rack, of a dog rocker, a stepping dog mounted on said dog rocker, a stop mounted on said dog rocker for arresting said stepping dog when the latter is disengaged from the rack, a second dog adjustable on said dog rocker to vary the extent of drop, and an extra stop for said stepping dog carried by said adjustable dog and coming into action when the drop is large.

6. In the carriage escapement of a typewriting machine, the combination with an escapement rack, a dog rocker vibrating transversely of said rack, and a normally engaged dog, of a normally disengaged rigid dog consisting of a piece of sheet metal secured to a face of said dog rocker and having a rack engaging section bent off therefrom, said rigid dog being adjustable to vary the extent of drop.

7. The combination of a toothed escapement wheel, a dog rocker vibrating transversely of said wheel, feed dogs including a bevel rigid dog consisting of a piece of sheet metal having a portion thereof secured against a face of said dog rocker, and another portion thereof bent off obliquely to constitute the beveled tooth-engaging part of said dog; and screws for detachably fastening said securing portion of said rigid dog rigidly to said dog rocker face, the said screws cooperating with said securing portion in a manner automatically to insure to said beveled tooth-engaging portion line contact with the engaged tooth of said wheel.

8. The combination of a dog rocker, a stepping dog mounted on one side of said dog rocker, and a piece of sheet metal secured to the opposite side of said dog rocker and having a section thereof bent off obliquely across said dog rocker so as to constitute a rigid bevel dog.

9. In the carriage escapement of a typewriting machine, the combination with an escapement rack and a dog support, of a bevel dog consisting of a piece of sheet metal secured to a face of said support and slotted to provide for adjustment, and an ear or branch bent off at an oblique angle and constituting the beveled engaging part of said dog.

10. In the carriage escapement of a typewriting machine, the combination with an escapement wheel and a dog support, of a bevel dog consisting of a piece of sheet metal having a curved slot concentric with said wheel to provide for adjustment of said dog about the axis of said wheel and an ear or branch bent off at an oblique angle and constituting the engaging part of said dog.

11. In the carriage escapement of a typewriting machine, the combination with an escapement wheel and cooperating feed dogs, of a margin dog adapted to engage said wheel, said margin dog consisting of an arm having an elongated bearing and swinging about said pivot in a plane tangent to the circle of rotation of the engaged part of said wheel.

12. In the carriage escapement of a typewriting machine, the combination with an escapement wheel, and cooperating feed dogs, of a margin dog adapted to engage said wheel, said margin dog consisting of an arm having an elongated bearing and swinging about said pivot in a plane tangent to the circle of rotation of the engaged part of said wheel; and a spring for said margin dog connected with said dog at a distance from said pivot and between said pivot and said wheel.

13. In a typewriting machine, the combination with an escapement rack and a dog rocker, of a margin dog adapted to be engaged with and disengaged from said rack, and a screw adjustable to variably control the disengagement of the margin dog from the rack.

14. In a typewriting machine, the combination with an escapement wheel and a dog rocker, of a margin dog, and a screw attached to the dog rocker for adjusting the position of said margin dog.

15. In a typewriting machine, the combination of an escapement mechanism including a toothed escapement wheel, a margin dog, and a screw 78 for adjusting the amount of lap of the margin dog on the escapement wheel tooth and for disengaging the margin dog from the rack at each operation of the escapement mechanism.

Signed at the borough of Manhattan, city of New York, in the county of New York and State of New York this 27th day of August A. D. 1918.

OSCAR WOODWARD.

Witnesses:
 CHARLES E. SMITH,
 E. M. WELLS.